United States Patent
Naick et al.

(10) Patent No.: US 7,561,674 B2
(45) Date of Patent: Jul. 14, 2009

(54) APPARATUS AND METHOD FOR PROVIDING AUTOMATIC LANGUAGE PREFERENCE

(75) Inventors: Indran Naick, Cedar Park, TX (US); Jeffrey Kenneth Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 11/095,735

(22) Filed: Mar. 31, 2005

(65) Prior Publication Data
US 2006/0222154 A1  Oct. 5, 2006

(51) Int. Cl.
*H04M 1/64*  (2006.01)
(52) U.S. Cl. ............... 379/88.06; 379/265.12; 379/433.06; 379/88.17
(58) Field of Classification Search ............ 379/88.17, 379/265.12, 88.06, 433.06
See application file for complete search history.

(56) References Cited

U.S. PATENT DOCUMENTS

| | | | |
|---|---|---|---|
| 5,841,852 A | 11/1998 | He | 379/201 |
| 5,949,856 A | 9/1999 | Stoller et al. | 379/93.01 |
| 6,069,939 A | 5/2000 | Fung et al. | 379/67.1 |
| 6,597,765 B1 | 7/2003 | Ksiazek | 379/88.06 |
| 6,925,155 B2 * | 8/2005 | Reynolds et al. | 379/88.05 |
| 7,139,380 B2 * | 11/2006 | Burger | 379/207.02 |
| 7,302,048 B2 * | 11/2007 | Evans et al. | 379/88.14 |
| 2002/0141404 A1 * | 10/2002 | Wengrovitz | 370/389 |

\* cited by examiner

*Primary Examiner*—Simon Sing
(74) *Attorney, Agent, or Firm*—Mark S. Walker; Suiter Swantz pc llo

(57) ABSTRACT

The present invention is directed to an apparatus and method for storing a language preference and providing the stored language preference automatically without any intervention of a user. The user may have an option to set a desired language preference on the calling apparatus such as a telephone device. A call center may send a query requesting language preference information of the user to the calling apparatus when the user makes a call connection to the call center. The desired language preference saved on the calling apparatus may be sent directly from the calling apparatus to the call center. In this manner, the user may not have to repeat a language selection process for every call made to the call center.

1 Claim, 5 Drawing Sheets

APPARATUS AND METHOD FOR PROVIDING AUTOMATIC LANGUAGE PREFERENCE

FIELD OF THE INVENTION

The present invention generally relates to telephone systems, and particularly to an apparatus and method for providing a user language preference for automated call centers.

BACKGROUND OF THE INVENTION

The world-wide proliferation of telephone communication has increased the desirability of making multi-language supported call centers. Modern call centers often provide a full range of high-volume, inbound or outbound call-handling services, including customer support, operator services, directory assistance, credit services, card services, interactive voice response, or the like. Most call centers ask users to set various parameters in order to provide proper services for each user. A language preference is a one of the parameters that each user may provide for the multi-language supported call center. For example, a conventional call center provides a series of announcements recorded in various languages. Thus, if the user desires to have a Spanish speaking operator, a Spanish Interactive Voice Recognition system or the like, the user may select the Spanish Language preference when an announcement in Spanish is prompted. Once the call center has recognized the language preference, for instance Spanish, the user may be able to communicate with the call center in Spanish.

Unfortunately, users often have to provide their language preferences at the beginning of every call made to the call center. Further, some users may select an undesired language preference due to a long and complicated process of the language preference selection.

Therefore, it would be desirable to provide an apparatus and method capable of storing a user selected language preference and providing the saved language preference for a call center. It would be also desirable to allow the call center to receive the language preference information directly from the telephone device without requiring any intervention of a calling user.

SUMMARY OF THE INVENTION

Accordingly, the present invention is directed to an apparatus and method for storing a language preference and automatically providing the stored language preference. The present invention may allow a user to have an option to set a desired language preference on a telephone device. A call center may send a query requesting language preference information of the user to the telephone device when the user makes a call connection to the call center. The desired language preference saved on the telephone device may be utilized to provide the language preference of the user for the call center. In this manner, the user may not have to repeat a language selection process for every call made to the call center.

In a first aspect of the present invention, a calling apparatus capable of providing automatic language preference information for a call center system is provided. The calling apparatus may comprise a memory unit, a processing and control unit, an input unit and the like. The processing and control unit may be capable of controlling the overall operation of the call apparatus. The calling apparatus may be suitable for receiving a language preference from the user via the input unit including a touch tone key pad unit. The user may select the language preference through a voice guided system, a language preference button (a physical switch on the telephone device), predetermined key patterns, or the like. The memory unit coupled to the processing and control unit may store the received language preference. Then, the stored language preference may be retrieved from the memory upon reception of the query from the call center system. The retrieved language preference may be provided directly for the call center system over a telephone network.

In a second aspect of the present invention, a method for saving language preference information on a telephone device and providing the language preference information automatically for a call center system is provided. The telephone device and the call center system may be capable of communicating with each other by exchanging conventional telephone signals. A user may be provided a list of language preference options supported by the call center. The list of language preference options may be provided through a voice guided system including audio messages associated with each language option. Alternatively, a language preference button on the telephone device may be provided to receive the language preference from the user. The user may select a desired language preference option from the provided list via the telephone device. The received language preference may be stored to a memory of the telephone device. The call center system may send a query to the telephone device when a user makes a call connection to the call center system. The query may include a request of the language preference of the telephone device which the user utilizes making the call connection. Then, the stored language preference may be retrieved from the memory of the telephone device. The retrieved language preference may be provided automatically for the call center system without an intervention of the user. In this manner, the user may not have to follow tedious language selection process every time the user tries to make a call connection to the call center.

In an advantageous aspect of the present invention, the communication between the telephone device and the call center with respect to the language preference may be transparent to the user. Further, the present invention may be independent on any particular phone devices or telephony systems. Thus, the present invention may be utilized by various phone device and phone service systems over telephone networks including public switched telephone networks, packet-switched data networks or the like.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 5, exemplary embodiments of the present invention are shown.

The present invention is directed to an apparatus and method for storing a language preference in a designated memory and providing the stored language preference automatically for a call center without any intervention of a user. The apparatus and method of the present invention may allow the user to have an option to set a desired language preference on the telephone device (the calling apparatus). The call center may send a query requesting language preference information directly to the telephone device when the user makes a call connection to the call center. The telephone device may provide the language preference of the user for the call center based on the saved language preference. In this manner, the user may not have to repeat a language selection process for every call made to the call center. In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Figure 1:
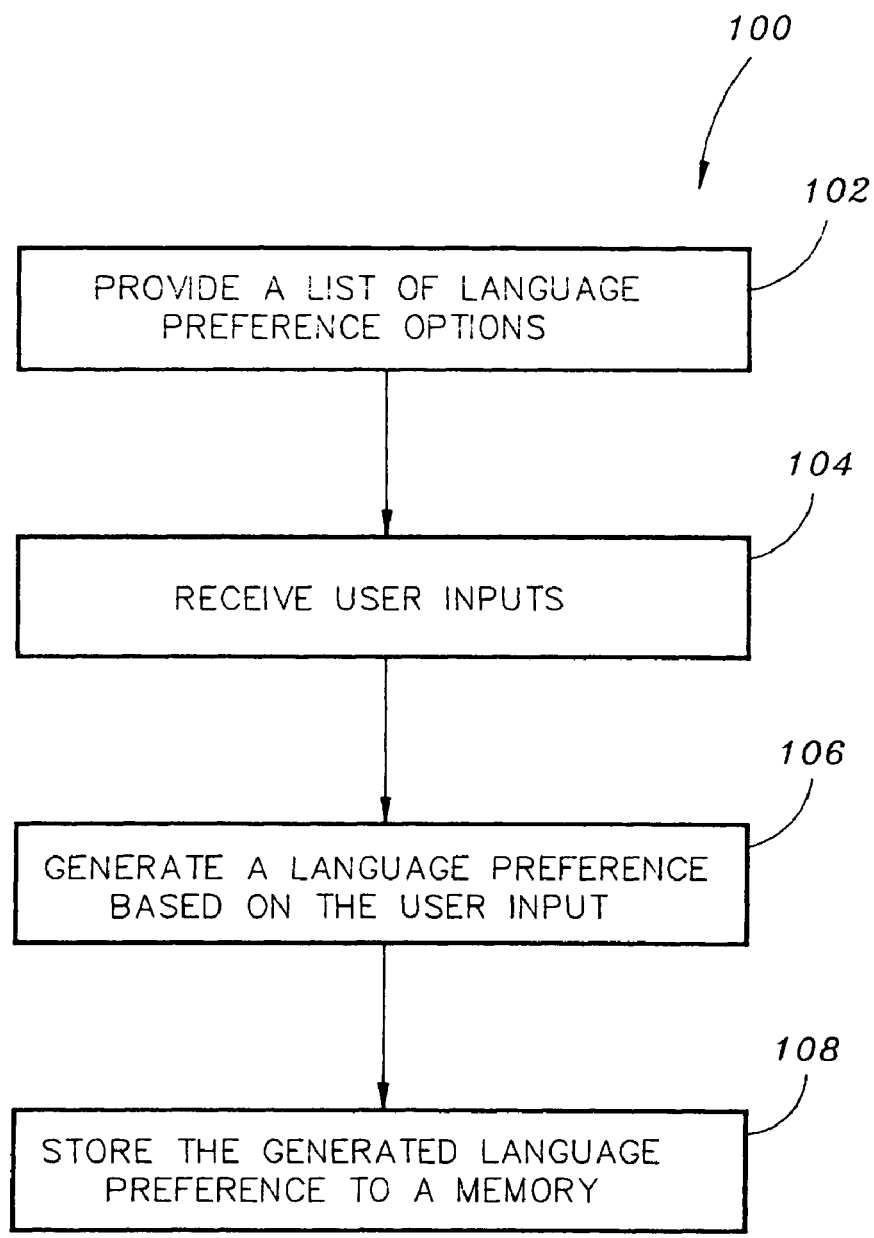
FIG. 1 is a flow diagram illustrating a method implemented in accordance with an exemplary embodiment of the present invention wherein a user sets a desired language preference on a calling apparatus.

Referring now to FIG. 1, a flow diagram 100 illustrating a method implemented by an embodiment of the present invention when a user sets a desired language preference on a calling apparatus. The method begins in step 102 in which a list of language preference options is provided by the calling apparatus. An example of the calling apparatus may include a conventional telephone device, a wireless telephone device, a cellular telephone device, a voice over Internet Protocol (VoIP) telephone device, or the like. Initially, the calling apparatus may have a default language preference set by a manufacturer. It should be appreciated that there are various ways to provide a list of language preference options. For example, a voice guided system may be utilized to provide the list of language preference options. The voice guided system may include audio messages associated with each language preference option. Audio messages may include instructions for the user to follow to set the language preference. For instance, an audio message such as "Please press *001 for English, *002 for Spanish, *003 for French. If you need more options, press *000." may be provided to the user via a calling apparatus speaker. The user may follow the announced instructions to select a desired language preference. Alternatively, predetermined keys for each language preference may be provided as part of a calling apparatus (e.g. a telephone, a cellular phone or the like) manual. In a particular embodiment of the present invention, a language preference button on the calling apparatus may be provided. The user may select the language preference by pressing the language preference button on the calling apparatus.

In step 104, the user input (e.g. the predefined key pattern, or the like) selecting the desired language preference may be received. For example, the user may enter "*002" using touch tone key pad of the calling apparatus to select Spanish for the desired language preference. In step 106, the language preference based on the received user input may be generated. In some instances, the received user input may have to be converted into a data form that is suitable for being utilized to communicate with the call center. In a particular embodiment, Dual tone multi-frequency (DTMF) signals may be utilized to communicate with the call center. One of skill in the art will appreciate that DTMF is a signaling system utilized in telephone devices with touch tone key pads in which each digit is associated with two specific frequencies. For example, 1209 Hz and 697 Hz for the digit one are generated and transmitted from the telephone device when the user presses the digit one on the keypad. Then, the language preference may be stored to a memory of the calling apparatus in step 108.

Figure 2:
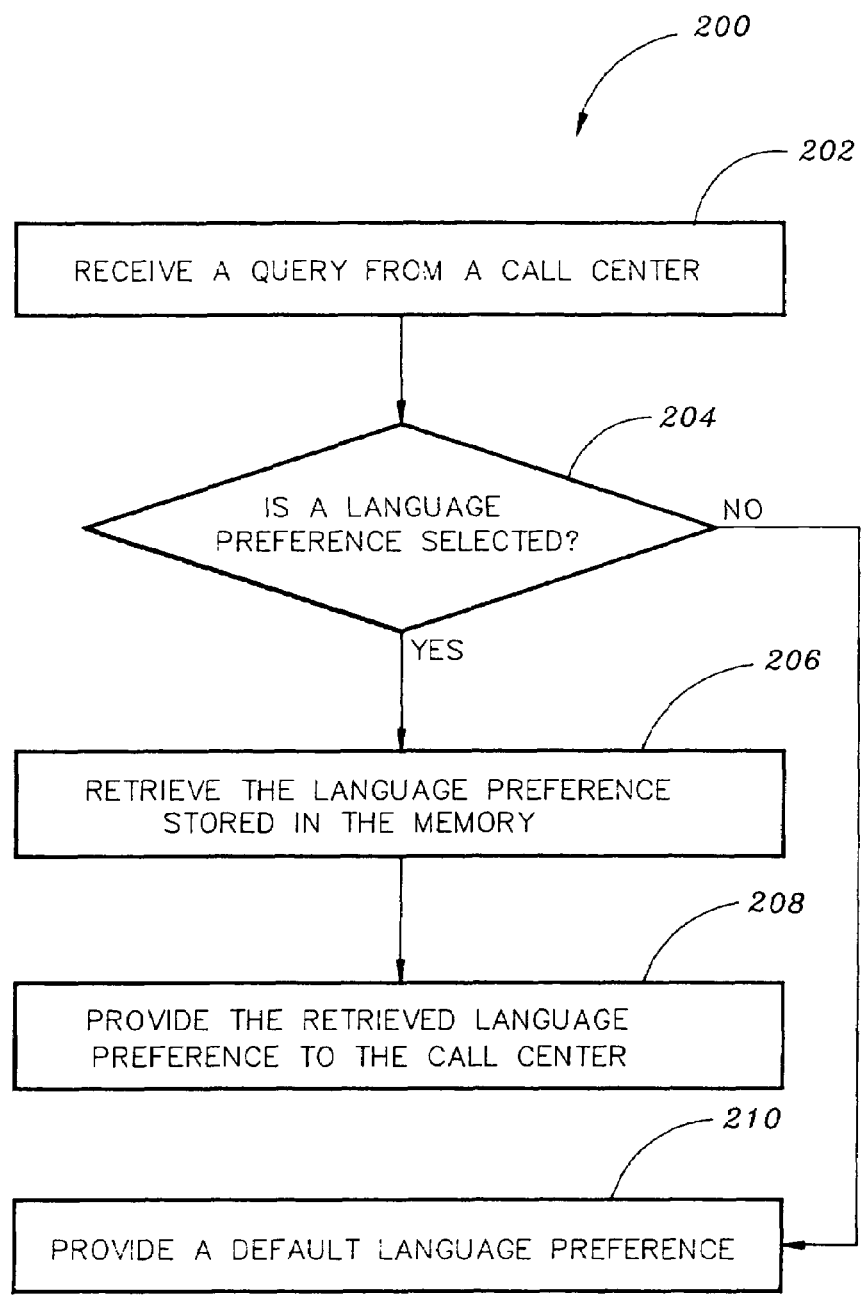
FIG. 2 is a flow diagram illustrating a method implemented in accordance with an exemplary embodiment of the present invention wherein the call center requests the language preference.

Referring now to FIG. 2, a flow diagram 200 illustrating a method implemented by an embodiment of the present invention when the call center requests the language preference after the user has made a call connection to the call center. The method begins in step 202 in which the call center sends a query requesting the language preference to the calling apparatus. Upon reception of the query, the calling apparatus may check whether the user has selected the language preference for the calling apparatus in step 204. If the user has selected the language preference, the language preference may be retrieved from the memory of the calling apparatus in step 206. Then, in step 208, the retrieved language preference may be provided for the call center. If the user has not selected the language preference, a default language preference of the calling apparatus may be provided for the calling center in step 210. Alternatively, the calling center may receive a notification from the calling apparatus that the language preference has not been selected.

One of skill in the art will appreciate there are various ways to provide the language preference for the call center without departing from the scope and spirit of the present invention or without sacrificing all of its material advantages. In a particular embodiment of the present invention, the call center may not send a query requesting the language preference. The calling apparatus may provide the stored language preference automatically for the call center at the time of the call connection.

Figure 3:
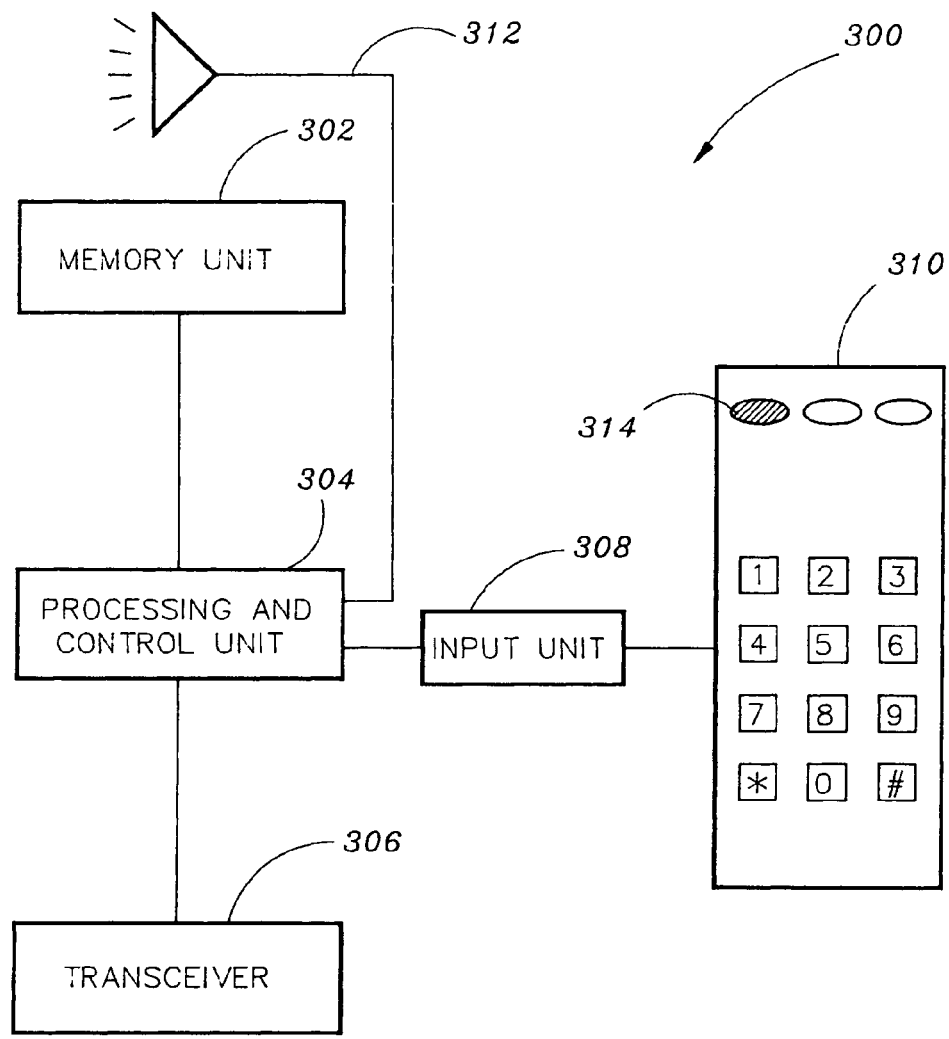
FIG. 3 is an illustration depicting an embodiment of the calling apparatus utilized in FIG. 1.

Referring now to FIG. 3, an illustration depicting an embodiment of the calling apparatus 300 utilized in the method described in FIG. 1 is shown. The calling apparatus 300 may be similar in structure and functionality as a conventional wireless phone device. It should be appreciated that the illustration shown in FIG. 3 is intended to be a conceptual block diagram and does not necessarily reflect the exact physical construction and interconnections of these components. The calling apparatus 300 includes a processing and control unit 304 which controls the overall operation of the calling apparatus 300. The processing and control unit 304 may include a general-purpose microprocessor, a digital signal processor (DSP), an application specific integrated circuit (ASIC), or the like. The processing and control unit 304 may comprise various types of signal conditioning circuitry (e.g. analog-to-digital converters, digital-to-analog converters), input/output buffer and the like.

A memory unit 302 coupled to the processing and control unit 304 may be suitable for storing information including a list of language preference options, a selected language preference, operational instructions or the like. The memory unit 302 may include a non-volatile storage device, volatile storage device or the like. For example, memory may include random access memory (RAM), read-only memory (ROM), various forms of programmable erasable ROM, flash memory and the like.

The calling apparatus 300 may comprise a transceiver 306, and inputs unit 308, a speaker 312 and the like. The speaker 312 is used to reproduce sound. The transceiver 306 may be used to transmit and receive data, including audio data and various other types of data utilized through a telephony system. Inputs unit 308 coupled to the processing and control unit 302 may include a touch tone pad unit 310 with several buttons. In another particular embodiment, the touch tone pad unit 310 may comprise a language preference button 314 allowing the user to select the desired language preference by pressing the language preference button 314.

Figure 4:
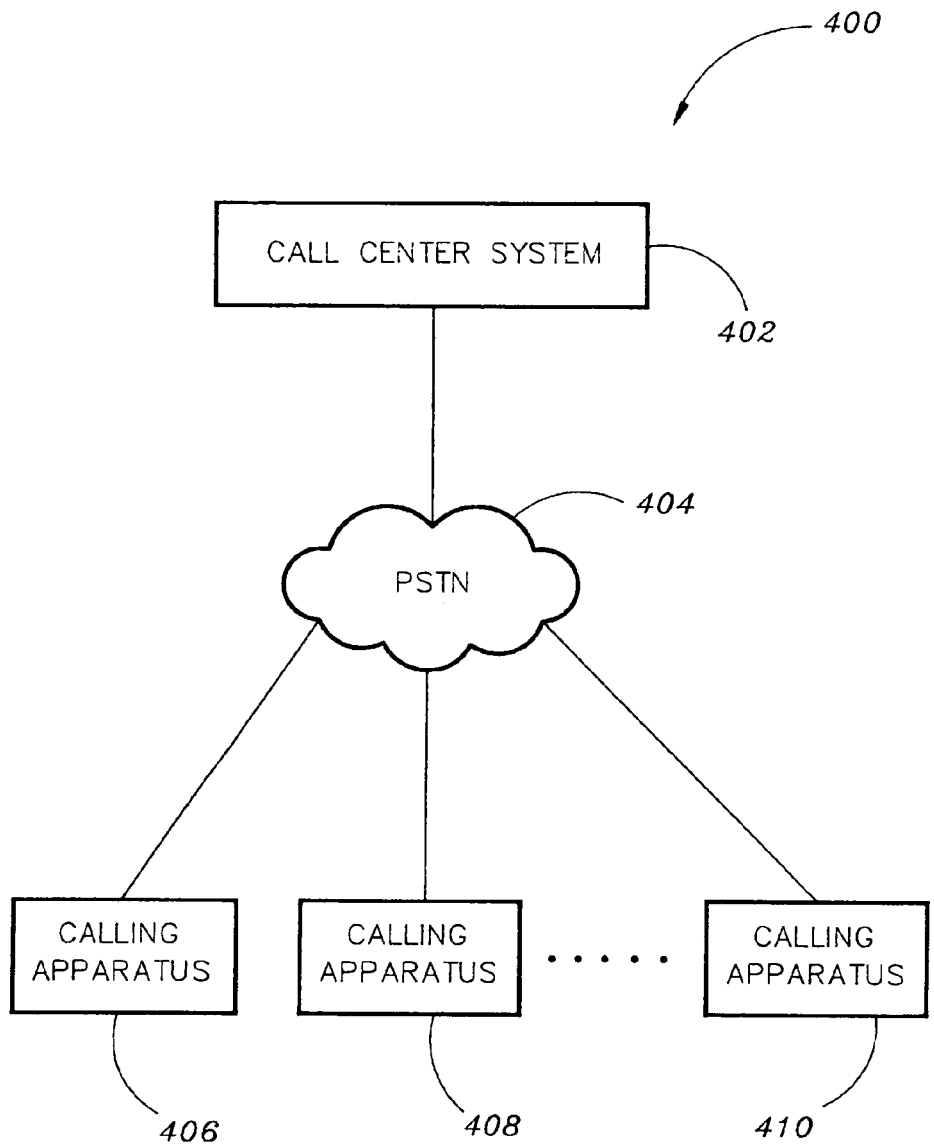
FIG. 4 is a block diagram illustrating an exemplary operational environment wherein a conventional telephony system is utilized.

Referring now to FIG. 4, a block diagram 400 illustrating an exemplary operational environment wherein conventional telephony systems are utilized is shown. A call center system 402 may be communicatively coupled to several calling apparatus 406-410 through a telephone network 404. The calling apparatus 406-410 may include any communication device capable of communicating with the calling center. An example of calling apparatus may include a wireless phone device, a conventional telephone device, a personal computers equipped with communications hardware/software or the like. In a particular embodiment, the telephone network 404 is a public switched telephone network (PSTN) which receives dual tone multi frequency (DTMF) signals. One of skill in the art will appreciate that establishing a call connection via the PSTN utilizing DTMF signals is known to the art. Alternatively, the telephone network 404 may include a wireless network, the Internet, or any network through which voice data (in either analog or digital form) may be sent and received.

A user may access the call center 402 by making a call connection via the calling apparatus 406-410. Conventionally a call center is a functional area within an organization or an outsourced, separate facility that exists solely to answer inbound or place outbound telephone calls. The call center system 402 may include any type of systems utilizing language preference information. For example, the call center system 402 may include, but is not limited to, multi-lingual customer support, operator services, directory assistance, credit services, card services, telemarketing services, help desks or the like.

In an embodiment of the present invention, the call center system 402 may comprise a sophisticated voice operations center utilizing Interactive Voice Recognition (IVR) systems or the like. The IVR systems may include automated call handling systems where the user interacts with a computer controller voice signal (either recorded real speech or computer generated). The interaction may be through the use of a touch tone telephone or through speech recognition.

Figure 5:
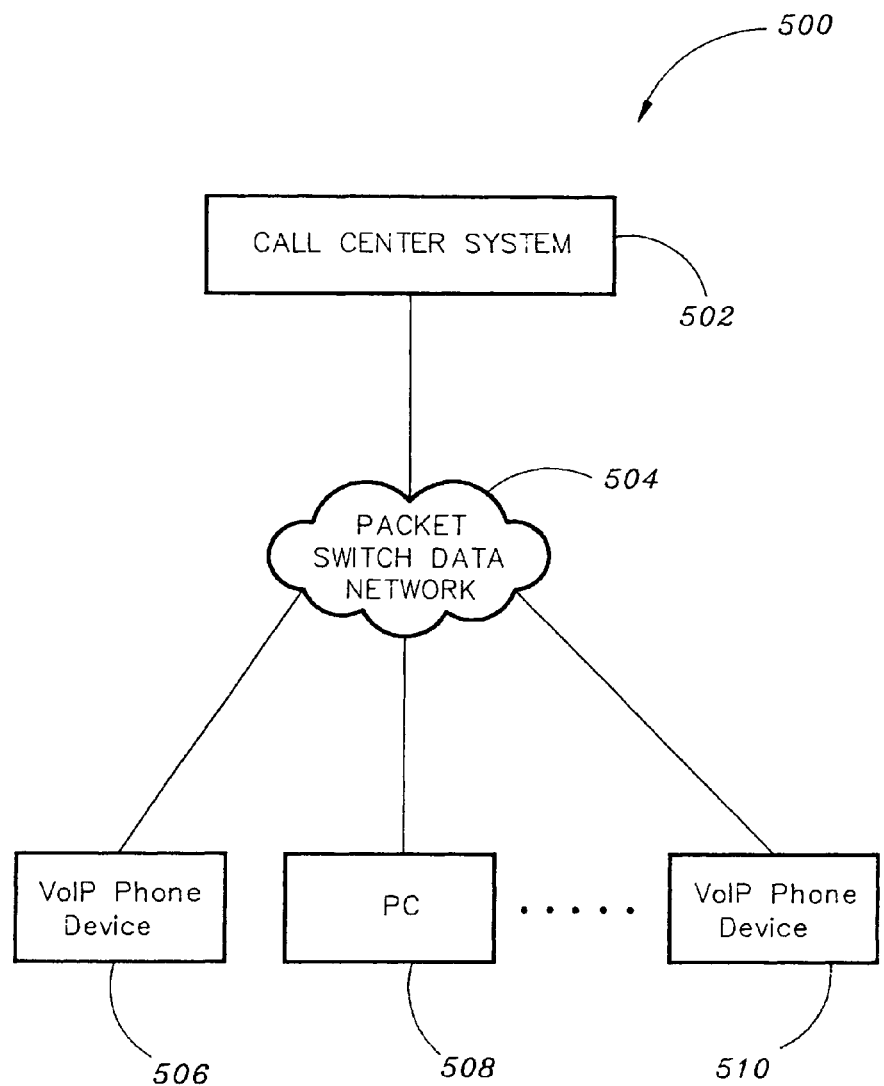
FIG. 5 is a block diagram illustrating an exemplary operational environment wherein a Voice over Internet Protocol is utilized.

In a particular embodiment of the present invention, Voice over Internet Protocol (VoIP) may be utilized for transmitting voice data. Referring now to FIG. 5, a block diagram 500 illustrating an exemplary operational environment wherein VoIP is utilized is shown. In FIG. 5, the call center system 502 communicatively coupled to several calling apparatus 506-510 over a packet-switched data network. Generally, VoIP delivers digitalized audio in packet form and can be used for transmitting data over intranet, extranet, the Internet or the like. VoIP may be an inexpensive alternative to conventional telephone communication over the PSTN.

In an embodiment of the present invention, the calling apparatus may include VoIP phone devices 506, 510, a personal computer 508 equipped with communications hardware/software, or the like. Additionally, the VoIP phone devices 506, 510 may support a parallel data session so that communication between the call center and the VoIP phone devices may be effected in a transparent manner. It should be appreciated that there are numerous ways to transmit data (e.g. digitalized audio, voice data or the like) over packet-switched data networks. For example, an extensible Markup Language (XML) file may be utilized to transmit data between the call center and the VoIP phone devices.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the apparatus and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for automatically setting a language preference when a user makes a call connection to a call center system, comprising:

receiving a language preference from the user, the receiving a language preference further including:

receiving a language preference selection provided via at least one of a predetermined key for each language preference, or a selectable language preference button on a telephone device, further including:

receiving the language preference selection from a plurality of selectable language preference options available upon receiving an indication that the language preference button has been depressed;

storing the received language preference to a memory in the telephone device;

receiving a query from the call center system requesting the language preference;

verifying whether a user has selected the language preference;

providing a response to the call center system including at least one of;

retrieving the language preference from the memory; and providing the retrieved language preference to the call center system; or notifying the call center system that the language preference has not been selected; and supporting a parallel data session so that a communication is made by exchanging data via a voice over Internet Protocol phone device, wherein a set of dual tone multi-frequency signals is utilized for the communication between the telephone device and the call center system.

* * * * *